Patented Oct. 20, 1936

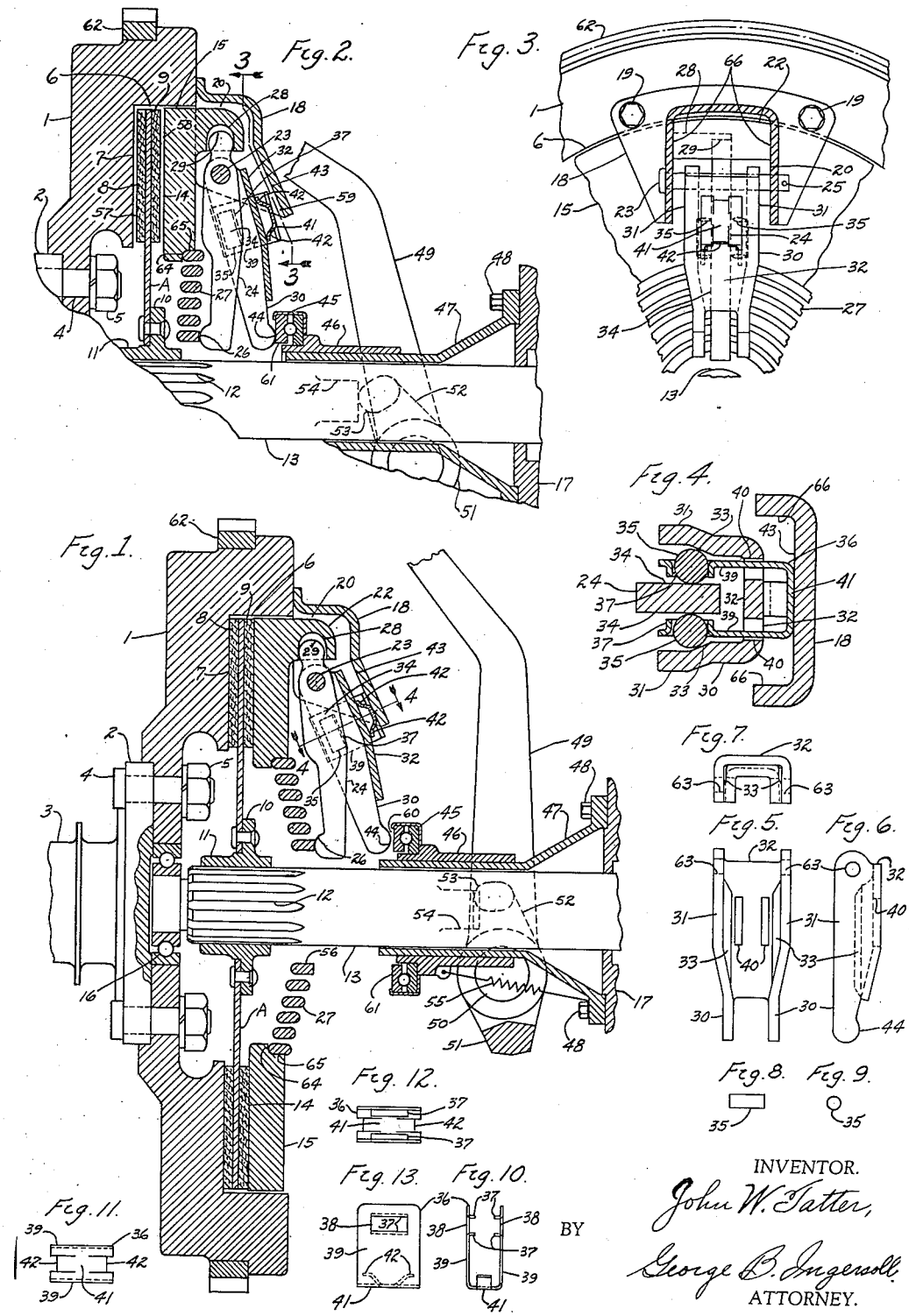

2,057,803

UNITED STATES PATENT OFFICE 2,057,803

CLUTCH

John W. Tatter, Detroit, Mich., assignor of one-half to George B. Ingersoll, Dearborn, Mich.

Application December 30, 1931, Serial No. 583,867

17 Claims. (Cl. 192—111)

My invention relates to improvements in clutches for motor vehicles, said clutch comprising friction members, and the objects of my improvement are, first, to provide a clutch with a plurality of friction members together with automatically operated means for taking up wear in the friction members, said means being supported in a lever operating mechanism; second, to provide a clutch having an automatic wear take-up means operating between a pair of lever members; third, to provide a clutch wear automatically operated take-up means having a locking mechanism comprising a roller member; fourth, to provide a clutch having a pair of lever members pivotally supported at a single fulcrum position; fifth, to provide a clutch having a single main thrust spring operating directly against a thrust driving member; sixth, to provide a clutch having a single main thrust spring together with release operating levers operating directly thereagainst; seventh, to provide a clutch having a plurality of bracket members for supporting its operating levers mechanism; eighth, to provide a clutch having a thrust spring and a bearing thrust member together with lever members directly mounted therebetween; ninth, to provide a clutch having a roller cage suitably mounted between a pair of operating levers; tenth, to provide a clutch having a lesser number of parts than used in ordinary automotive clutch units; eleventh, to provide a clutch having a single main thrust spring located within the inside diameters of its frictionally engaged portions; and twelfth, to provide a pair of lever members with a lost motion mechanism therebetween.

I attain these objects by the mechanism illustrated in the accompanying drawing, in which—

Figure 1 is a sectional view of the clutch assembly within the flywheel of a motor, said view disclosing the clutch members in their engaged position; Fig. 2, a partial sectional view of the clutch assembly, said view disclosing the clutch in its disengaged position; Fig. 3, a partial sectional and end elevation disclosing one of the lever operating units and its supporting bracket mounted on the flywheel, said sectional portion being taken on the line 3—3, Fig. 2; Fig. 4, a sectional view of the locking mechanism taken on the line 4—4, Fig. 1; Fig. 5, a front elevation of one of the operating levers; Fig. 6, a side elevation of the operating lever disclosed in Fig. 5; Fig. 7, an end elevation of the operating lever disclosed in Figs. 5 and 6; Fig. 8, a side elevation of one of the locking rollers; Fig. 9, an end elevation of the locking roller disclosed in Fig. 8; Fig. 10, an end elevation of one of the locking roller retainers; Fig. 11, a bottom view of the locking roller retainer disclosed in Fig. 10; Fig. 12, a plan elevation of the locking roller retainer disclosed in Figs. 10 and 11; and Fig. 13, a side elevation of the locking roller retainer disclosed in Figs. 10, 11, and 12.

Similar numerals refer to similar parts throughout the several views.

The flywheel 1 is mounted on the flange 2 of the crankshaft 3 of an engine. The flywheel 1 is held on the flange 2 by the bolts 4 and the nuts 5. The flywheel 1 is provided with the chamber 6 together with the friction face 7. The driven member assembly A is provided with the friction discs 8 and 9 and is suitably fastened to the flange 10 of the hub 11 which is slidably mounted on the splines 12 of the shaft 13. The driven member assembly A is disposed between the friction face 7 of the flywheel 1 and the friction face 14 of the thrust member 15.

The shaft 13 is supported at its front end in the bearing assembly 16 which is mounted in a recess of the flywheel 1 and at its rear end in a bearing assembly (not shown) which is suitably mounted in a conventional way in a transmission housing 17, which together with a clutch housing (not shown) surrounds the clutch assembly in a conventional manner.

Instead of the usual and expensive type of clutch cover assembly, I employ a plurality of brackets 18 which not only reduce the cost of production but provide for a much more efficient flow of air through the clutch assembly and prevents deterioration of the clutch operating units from the destructive heat developed in the usual type of clutch.

The bracket 18 is fastened to the flywheel 1 by the screws 19, the bracket 18 being provided with a recess 20 into which extends the boss 22 of the thrust member 15, the boss 22 engaging the side walls 66 of the recess 20, the bracket 18 thereby providing means for driving the thrust member 15 through its bosses 22.

The shaft 23 extends through the side walls 66 of the bracket 18 and provides the fulcrum for the lever 24 which is pivotally mounted thereon, the shaft being retained by the cotter pin 25. The lever 24 is provided with the rounded portion 26, at its inner end, for engaging the thrust spring 27 which may be ground flat and square on its rear face for engaging the rounded portion 26 of the lever 24. Also the thrust spring 27 may be constructed of coils of sufficient width and thickness to provide an ample thrust engaging surface for the rounded portion 26 of the lever 24.

The thrust spring 27 is mounted within and against the surfaces 64 and 65 of the thrust member 15, thus locating the thrust spring 27 within the thrust member 15. It will thus be noted that the thrust spring 27 is located within the inner diameters of the friction members 8 and 9 and the friction surface 14 engaged by the friction member 9 and is entirely open to the passage of air between its coils and by the lever operating and supporting members, thus providing for efficient dissipation and radiation of heat generated in the friction faces of the clutch members without injuring the heat treated characteristics of the clutch spring 27.

The boss 22 of the thrust member 15 is provided with a recess 28 which can be constructed therein to extend from one of the sides of the boss 22 to a sufficient distance beyond its center to provide for mounting the rounded portion 29, at the outer end of the lever 24, therein on the center of the boss 22 and on the center of the clutch assembly. The recess 28 extending only from one of the sides of the boss 22 thus retains sufficient stock thickness of the boss 22 to withstand the driving stress imposed thereon by the bracket 18. It is also to be noted that recess 28 will be made of slightly larger size than the rounded portion 29 of the lever 24 to permit the rounded portion 29 to slide within the recess 28 when the thrust member 15 is slidably moved by the pivotal action of the lever 24.

The lever 30 is provided with the holes 63 to permit the lever 30 to be pivotally mounted on the shaft 23, thus providing a common fulcrum point for both of the levers 24 and 30. The lever 30 is provided with the portions 31, in which are formed the holes 63, the portions 31 extending on each side of the lever 24, the portions 31 being connected by the portion 32. The portions 31 are further provided, on their inner sides, with the angular surfaces 33 oppositely disposed and extending longitudinally relative to the lever 24, the angular surfaces being located adjacent the portions 31 and extending longitudinally therewith. It is to be noted that the sides 34 of the lever 24 will be parallel and, with the angular surfaces 33 of the lever 32 will be constructed with smooth flat surfaces which will be sufficiently hard to resist scoring or deformation in any way when engaged by the rollers 35 which are supported therebetween and held in engagement therewith by the retainer member 36.

The retainer member 36 is provided with the flanges 37 adjacent the opening 38 in which are mounted the rollers 35, the flanges 37 forming flat surfaces which will always be in engagement with the rollers 35, even when the rollers 35 are slightly displaced in a transverse direction relative to the retainer member 36.

The retainer member 36 is provided with the side portions 39 which are slidably supported in the openings 40 in the portion 32 of the lever 30, the openings 40 being of sufficient width to allow the flanges 37 to be assembled therethrough. The side portions 39 of the retainer member are connected with the portion 41. The retainer member 36 may be constructed of relatively thin spring steel having resilient fingers 42 stamped out of the portion 41 in such manner as to contact with the outer rear surface of the portion 32 of the lever 30, the resilient fingers 42 thus always tending to force the retainer member 36 outwardly toward the inner surface 43 of the bracket 18, this in turn holding the rollers 35 in engagement with the surfaces 34 of the lever 24 and the angular surfaces 33 of the lever 30, thus preventing rattles and positive initial engagement of the rollers 35 and the respective levers 24 and 30 when operating the clutch to a released position as disclosed in Fig. 2.

The portions 31 of the lever 30 are extended at their innner ends and are provided with the rounded portions 44 for engaging the face of the thrust bearing assembly 45 when the clutch is being operated to its released position.

The thrust bearing assembly 45 may be mounted, in a conventional manner, on the sleeve 46 which is slidably mounted on the extension bracket 47 which is suitably fastened to the transmission housing 17 by the screws 48, the extension bracket 47 surrounding the shaft 13.

The pedal 49 is suitably mounted and supported with its throwout shaft 50 and its throwout yoke member 51, mounted on the throwout shaft 50, in a position adjacent the sleeve 46, so that the yoke member 51 will have a pair of arms 52 extending upwardly on each side of the sleeve 46, the arms 52 being provided with rounded portions 53 which engage the rear face of the bosses 54 of the sleeve 46, the bosses 54 fitting between the rounded portions 53 of the arms 52, in a conventional manner, to restrain the sleeve 46 from turning on the extension bracket 47 when the thrust bearing assembly 45 is engaging the rounded portions 44 of the levers 30. Also the springs 55 may be suitably attached to the sleeve 46 and the extension bracket 47 to always return the sleeve 46 and the thrust bearing assembly 45 to their normal positions adjacent the arms 52 when the clutch assembly is in an engaged position as disclosed in Fig. 1.

The pedal 49 together with the yoke member 51 and the shaft 50 may be supported in the usual way on a conventional clutch housing (not shown) which may be suitably supported in connection with a flywheel housing (not shown).

It is to be noted that, when the operator depresses the pedal 49, the rounded portion 53 of the yoke 51 will engage the bosses 54 of the sleeve 46 and cause the sleeve 46 to slide along the extension bracket 47, the thrust bearing assembly engaging the rounded portions 44 of the lever 30 and causing the lever 30 to pivotally move about the shaft 23. As the lever 30 pivotally moves forward, the angular surfaces 33 of the lever 30 will cause the rollers 35 to roll along the flat surfaces 34 of the lever 24, the rolling movement of the rollers 35 causing the rollers 35 to become wedged and locked between the angular surfaces 33 of the lever 30 and the flat surfaces 34 of the lever 24, as soon as the rollers 35 become locked therebetween, the lever 24 will begin, together with its rounded portions 26, to pivotally move forward, the rounded portions 26 of the lever 24 engaging the rear face of the inner coil 56 of the thrust spring 27, thus compressing the thrust spring 27 and at the same time causing the rounded portion 29 of the outer portion of the lever 24 to move rearwardly and, engaging the rear surface of the recess 28 of the thrust member 15, causing the thrust member 15 to be moved rearwardly away from the friction disc assembly A and against the compression of the thrust spring 27, the clutch assembly being thus operated to its released position as disclosed in Fig. 2, in which position the clearance spaces 57 and 58 will exist respectively between the friction disc assembly A and the friction surfaces 7 and 14 of the flywheel 1 and the thrust member 15.

It will be noted that there will be no perceptible loss of movement, when the thrust bearing 45 engages the rounded portions 49 of the lever 24, before the lever 24 begins to move with the lever 30 because the resilient fingers 42 of the retainer member 36 will always lightly maintain the rollers 35 in engagement with the angular surface 33 of the retainer member 36 and the surfaces 34 of the lever 24. Also it is to be noted that, when the clutch is in its released position, as disclosed in Fig. 2, the clearance space 59 will exist between the retainer member 36 and the bracket 18. As the operator releases the pressure on the pedal 49 to allow the clutch to move from its released position, as disclosed in Fig. 2, to a fully engaged position, as disclosed in Fig. 1, the thrust spring 27 will force the rounded portion 26 rearwardly which will cause the rounded portion 29 of the lever 24 to move forwardly and, by its engagement with the forward inner surface of the recess 28 of the boss 22 of the thrust member 15, cause the friction face 14 of the thrust member 15 to engage the friction disc assembly A with great force. When the lever 24 is thus being moved rearwardly by the thrust spring 27, during the clutch engaging operation, the rollers 35 will remain in locking engagement between the levers 24 and 30 and cause the rollers 35, the retainer member 36, and the lever 30 to also move rearwardly until the retainer member engages the surface 43 of the bracket 18 in which position the clutch assembly will be fully engaged, as disclosed in Fig. 1, a clearance space 60 existing between the rounded portion 44 of the lever 30 and the forward surface of the race 61 of the bearing assembly 45, the race 61 being free to rotate while the remaining race of the bearing assembly 45 is fixed on the sleeve 46.

It will thus be noted that, when the clutch assembly is in its fully engaged position, as disclosed in Fig. 1, the only pressure exerted on the lever 30 will be that of the resilient fingers 42 of the retainer member 36, the resilient fingers 42 tending to lightly force the retainer member 36 against the bracket 18 and to maintain the rollers 35 in just sufficient contact with the surfaces 34 of the lever 24 and the angular surfaces 33 of the lever 30 as to maintain the retainer member 36, the rollers 35, and the lever 30 from rattling, this light contactual engagement of the rollers 35 permitting ready movement of the surfaces 34 of the lever 24 rearwardly whenever the thrust member 15 moves forwardly the slightest amount due to wear of the friction faces of the friction disc assembly A. When the lever 24 moves rearwardly under the pressure of the thrust spring 27, due to wear of the friction discs and the resultant forward movement of the thrust member 15, the tendency of the rollers 35 to lock between the surfaces 34 and 33 is prevented because the pressure of the thrust spring 27 is greater than the resilient fingers 42 which causes the retainer member 36, when it is thus forced against the surface 43 of the bracket 18, to be slidably moved forward together with the rollers 35, the rollers 35 thus being prevented from assuming a locked position between the levers 24 and 30 when the clutch is in its engaged and running position, the lever 24 and its surfaces 34 thus being free to move rearwardly between the rollers 35 to find its position as dictated by the wear of the faces of the friction disc assembly A, the clutch thereby being maintained always in a correctly adjusted position relative to the friction engaging members and without disturbing the normal position of the pedal 49.

The flywheel 1 is disclosed as being provided with the starting ring gear 62.

It is to be noted that my invention will provide means that will operate continuously, while the clutch is operating in its engaged position, to take up wear clearance in its friction members and will permit the clutch release mechanism to operate the clutch continuously, without allowing the various slight changes in the positions of the driving and driven members, due to the take-up of wear clearances, to affect the normal position of the operating pedal.

It is also to be noted that, if desired, the levers 24 and 30 may be utilized with a single roller 35, one of the rollers 35 being dispensed with on the opposite side of the lever 24, the lever 30 and the retainer member 36 then being respectively provided with single flange portions 31 and 39.

I claim:

1. In a friction clutch, the combination of a driving member, a driven member, a clutch main shaft, a thrust member engaging said driven member, and means for forcing said thrust member into engagement with said driven member, said means comprising a pair of lever members together with a rollable member for locking said pair of levers together.

2. In a friction clutch, the combination of a thrust member, a pair of levers pivotally mounted, to move about a common fulcrum point located adjacent their outer ends relative to the axis of the clutch, one of said levers engaging said thrust member, and means for locking said pair of levers together, said means permitting movement of one of said pair of levers relative to the other of said pair of levers.

3. In a friction clutch, the combination of a pair of members oscillating about a common fulcrum, said pair of members being adapted to revolve about the axis of the clutch, and means for connecting said pair of members, said means comprising members wedged between said pair of members.

4. In a friction clutch, the combination of a pair of levers, said levers having their lever portions extending longitudinally adjacent one another, a member rollably mounted between said pair of levers, and means for retaining said member.

5. In a friction clutch, the combination of a lever pivotally mounted, a second lever, said second mentioned lever being provided with an angular surface, said levers revolving with the clutch about its axis, and a roller member between said first mentioned lever and the angular surface of said second mentioned lever.

6. In a friction clutch, the combination of a pivotally mounted member having a lever arm provided with a flat surface extended longitudinally of the lever arm, a second pivotally mounted member having a lever arm, provided with a surface extending at an angle with the flat surface of said first mentioned member, said surface of said second pivotally mounted member extending longitudinally on the lever arm thereof, and a rollably mounted member for locking said first mentioned and said second mentioned members together, said last mentioned member engaging the flat surface of said first mentioned member and the angular surface of said second mentioned member.

7. In a friction clutch adapted to revolve about an axis, the combination of a pair of levers engaging a common fulcrum supported on a portion of the clutch adapted to revolve about said axis, and means rollably engaging said pair of levers, said means permitting relative movement of said levers in one direction, said means preventing relative movement of said levers in an opposite direction.

8. In a friction clutch, the combination of a driving member, a bracket mounted on said driving member, a pair of levers pivotally mounted in said bracket, locking members between said pair of levers, and means for retaining said locking members, said means engaging said bracket when the clutch is in its engaged position.

9. In a friction clutch, the combination of a pair of levers having lever arm portions and means for locking said pair of levers together when said levers are moving in one direction, said means comprising rollable members having a longitudinal axis, extending parallel with the lever arm portions of said levers.

10. In a friction clutch, the combination of a friction member, a thrust member, a lever member operatively connected with said thrust member and adapted to move said thrust member against said friction member, roller means engaging said lever member, said roller member extending longitudinally with said lever member, a second lever engaging said roller means, a bearing assembly engaging said second lever, and means for actuating said bearing assembly axially of the clutch.

11. In a friction clutch comprising a driving member, the combination of a bracket mounted on said driving member and a pair of levers mounted in said bracket, said pair of levers being locked together when moving in one direction, said pair of levers being unlocked for a portion of their movement when moving in an opposite direction.

12. In a friction clutch, the combination of a driving member, a driven member, a thrust member for engaging said driven member, a bracket member suitably mounted on said driving member, said bracket member being engaged by said thrust member, a pair of lever members pivotally mounted in said bracket member, and a rollably mounted member suitably mounted between said pair of lever members to permit said lever members to be operated in locked and unlocked relationship to one another.

13. In a friction clutch, the combination of a thrust member, a pair of levers suitably mounted adjacent said thrust member and adapted to actuate said thrust member, means rollably mounted between and adapted for locking said pair of levers to move as a unit in one direction, said means permitting said pair of levers to move relative to one another in an opposite direction, and means for actuating said pair of levers, said last mentioned means comprising a pedal lever.

14. In a clutch adapted to rotate about an axis, an adjusting means adapted to rotate with the clutch, said means including a pair of lever members each engaged by a rollably mounted member therebetween, said rollably mounted member permitting said pair of lever members to operate as a locked unit, said rollably mounted members further permitting said pair of levers to be adjustably unlocked relative to one another when wear occurs in the clutch.

15. In a friction clutch, the combination of a pair of pivoted members each having lever portions disposed angularly relative to one another, a member rollably mounted between the lever portions of said pair of pivoted members, means for retaining said last mentioned member, and resilient means for actuating said first mentioned means to maintain said last mentioned member in contact with said lever portions of said pair of pivoted members.

16. In a clutch, the combination of a lever for operating the clutch to disengaged positions, and clutch adjusting means operated by said lever with approximately no loss of movement of said lever, said clutch adjusting means including a pair of lever members together with a member rollably supported between said pair of lever members, said clutch adjusting means being remotely located from said lever for operating the clutch to disengaged positions.

17. In a friction clutch comprising a thrust member, the combination of a bearing member suitably mounted, a resilient member suitably mounted to move said thrust member in one direction, a pair of pivotally mounted members adapted to compress said resilient member, one of said pair of pivotally mounted members engaging said resilient member, the other of said pair of pivotally mounted members engaging said bearing member, and means for moving said bearing member to pivotally move said pair of lever members.

JOHN W. TATTER.